Patented Aug. 21, 1923.

1,465,842

UNITED STATES PATENT OFFICE.

RICHARD D. CHEESMAN, OF CHELSEA, MICHIGAN, AND ROBERT C. HAFF, OF HAGERSTOWN, MARYLAND, ASSIGNORS, BY MESNE ASSIGNMENTS, TO WESTERN PRECIPITATION COMPANY, OF LOS ANGELES, CALIFORNIA, A CORPORATION OF CALIFORNIA.

PROCESS OF OBTAINING WATER-SOLUBLE POTASSIUM COMPOUNDS.

No Drawing.   Application filed May 24, 1917.   Serial No. 170,740.

*To all whom it may concern:*

Be it known that we, RICHARD D. CHEESMAN and ROBERT C. HAFF, citizens of the United States, and residents of Chelsea, in the county of Washtenaw and State of Michigan, and Hagerstown, in the county of Washington and State of Maryland, respectively, have invented new and useful Improvements in Processes of Obtaining Water-Soluble Potassium Compounds, of which the following is a specification.

The present invention relates to a process of obtaining water soluble, or readily water soluble, potassium compounds, and has particular reference to such a process for increasing the yield of the water soluble, or readily water soluble, compounds, obtainable from dust, gases, or a mixture thereof, occurring during the production of Portland cement.

The invention is founded upon the discovery that the insolubility, or imperfect solubility of potassium compounds, which are present in the dust, gases, or mixture thereof, as above indicated, is caused by the combination of the volatile potassium compounds with the ash constituents of the coal. These ash constituents result from the combustion of the powdered coal, employed in the process of producing Portland cement, as is well known. The soluble potassium compounds are measurably prevented from combining with the ash constituents and the proportion of the potassium compounds which is retained in a soluble form is increased. For accomplishing this result, the alkali metal compound, such as sodium chloride, may be mixed with the powdered coal, or it may be introduced into the raw mix.

In the practice of our process in its preferred form, a suitable amount of an alkali metal compound such as sodium chloride or salt, is intimately mixed with the powdered coal, in suitable proportions to combine with all or substantially all of the ash contents of the coal. We have found that satisfactory results are obtainable by employing one percent by weight of the sodium chloride or salt with respect to the weight of the raw mix, while these proportions may be varied, and satisfactory results obtainable by greatly increasing the percent by weight of the sodium chloride or salt. We prefer to add the sodium chloride or salt to the powdered coal and intimately mix the same therewith, as this brings the sodium chloride in close contact with the ash contents, but the invention is not necessarily restricted to this specific manner of introducing sodium chloride, as satisfactory results are obtainable by adding the same to the raw mix, or otherwise introducing the same into the kiln because at the temperature of the kiln the salt is largely volatilized and thus has an opportunity to mix with and act on the fine particles of ash floating in the gases of the kilns.

The constituents of Portland cement, such as clay and lime stone, are finely divided or ground and introduced into a rotary kiln. This mixture is then subjected to the action of heat and products of combustion which enter the kiln, from suitable burners employing the mixture of powdered coal and sodium chloride or salt, as fuel. The addition of sodium chloride to the powdered coal used in burning to the extent proposed, amounting as it does to 6% of the weight of the coal, might be expected to seriously interfere with the intensity and efficiency of such combustion, but our experience in actual practice has been to show that this is not the case.

It is found that the silica, iron and alumina of the ash, combine with the sodium equivalent. This allows the volatile potassium compounds, to combine with other elements, such as sulphur, etc., to form soluble potassium compounds.

The dust, gases, or a mixture thereof, which pass from the kiln, and contain the water soluble potassium compounds, are suitably treated to recover such compounds.

In the practice of this process, we have also discovered that the addition of the sodium chloride or salt to the cement kilns, the same being added to the coal dust or the raw mix, has the effect of increasing the ease with which the alkalies are driven off from the clinker. By the introduction into the kiln of the sodium chloride, in the proportions stated, which is a relatively large amount of alkali, the conditions of operation within the furnace are so changed or modified, that when burned at any particular temperature, and contrary to what might be expected, the total amount of alkali which is left in the clinker is found to be less than if the salt or sodium chloride were not added.

The foregoing process is at the present time believed to be the best embodiment of our invention, but we do not wish to be limited to the precise steps as set forth, nor limit ourselves to the chemicals outlined above, and it is to be understood that the steps of the process may be modified in many different ways that may fairly fall within the scope of the appended claims.

Having thus described our invention, what we claim is:

1. The herein described process of obtaining water soluble potassium compounds and Portland cement, which consists in mixing an alkali metal compound with coal, burning such mixture, subjecting the constituents of a Portland cement mix to the direct action of the products of combustion from the mixture whereby the cement is formed and the water soluble potassium compounds are obtained in the dust and gases which are given off by said constituents, and treating the dust and gases to recover the water soluble potassium compounds contained therein.

2. The herein described process of obtaining water soluble potassium compounds and Portland cement, which consists in mixing a sodium compound with powdered coal, burning such mixture, subjecting the constituents of a Portland cement mix to the direct action of the products of combustion from the mixture whereby the cement is formed and the water soluble potassium compounds are obtained in the dust and gases which are given off by said constituents, and collecting and treating the dust and gases to recover the water soluble potassium compounds.

3. The herein described process of obtaining water soluble potassium compounds and Portland cement, which consists in introducing a mix containing the constituents of Portland cement into a kiln, mixing one percent by weight with respect to the weight of the mix of a sodium compound with powdered coal, burning the powdered coal thus mixed and subjecting the mix to the direct action of the products of combustion therefrom, thereby forming the cement and fuming off the water soluble potassium compounds and collecting and separating out the water soluble potassium compounds.

4. In the manufacture of Portland cement with recovery of combined potassium by clinkering a potassiferous raw mix by direct firing with coal in a cement kiln and collecting fumed-off potassium compounds, the method of increasing the proportion of readily soluble combined potassium in the dust and gases discharged from the kiln, which comprises additionally introducing into the kiln and into reacting proximity with the coal ash particles suspended in the hot kiln atmosphere, a compound of an alkaline-oxid-forming metal capable of reacting with said ash particles to oppose formation of difficultly soluble combinations of the ash with combined potassium also present in the kiln atmosphere.

5. In the manufacture of Portland cement with recovery of combined potassium by clinkering a potassiferous raw mix by direct firing with coal in a cement kiln and collecting fumed-off potassium compounds, the method of increasing the proportion of readily soluble combined potassium in the dust and gases discharged from the kiln which comprises additionally introducing into the kiln and into reacting proximity with the coal ash particles suspended in the hot kiln atmosphere, an alkali metal compound capable of reacting with said ash particles to oppose formation of difficultly soluble combinations of the ash with combined potassium also present in the kiln atmosphere.

RICHARD D. CHEESMAN.
ROBERT C. HAFF.